United States Patent [19]
Reid et al.

[11] Patent Number: 5,455,880
[45] Date of Patent: Oct. 3, 1995

[54] OPTICAL FIBER CABLE CONNECTOR ASSEMBLY

[75] Inventors: Robert A. Reid, Avon; Jon A. Lutzen, Manchester; Rudolph A. Montgelas, West Hartford, all of Conn.

[73] Assignee: SpecTran Specialty Optics Co., Avon, Conn.

[21] Appl. No.: 159,832

[22] Filed: Dec. 1, 1993

[51] Int. Cl.⁶ .................................................. G02B 6/36
[52] U.S. Cl. ..................................... 385/87; 385/86
[58] Field of Search ................................. 385/69, 86, 87

[56] References Cited

U.S. PATENT DOCUMENTS

| | | | |
|---|---|---|---|
| 4,397,522 | 8/1983 | Parr | 385/62 |
| 4,679,895 | 4/1987 | Huber | 385/87 |
| 4,753,510 | 6/1988 | Sezerman | 385/61 |
| 4,773,725 | 9/1988 | Ashman et al. | 385/87 |
| 4,804,244 | 2/1989 | Hasegawa et al. | 385/87 |
| 5,071,218 | 12/1991 | Nishimoto | 385/60 |
| 5,104,242 | 4/1992 | Ishikawa | 385/53 |
| 5,113,474 | 5/1992 | Slaney et al. | 385/136 |
| 5,121,455 | 6/1992 | Palecek | 385/69 |
| 5,140,661 | 8/1992 | Kerek | 385/81 |
| 5,159,652 | 10/1992 | Grassin D'Alphonse et al. | 385/56 |
| 5,170,452 | 12/1992 | Ott | 385/60 |
| 5,216,733 | 6/1993 | Nagase et al. | 385/60 |
| 5,216,734 | 6/1993 | Grinderslev | 385/60 |
| 5,230,032 | 7/1993 | Muzslay | 385/66 |

*Primary Examiner*—Frank Gonzalez
*Attorney, Agent, or Firm*—Pennie & Edmonds

[57] ABSTRACT

A connector assembly for the at least partially stripped end of an optical fiber cable includes a crimp ring (10) having a longitudinal bore (14) therethrough, the bore having a large diameter portion (20) and a small diameter portion (22). The large diameter portion is adapted to engage a jacketed segment of cable (28) whereas the small diameter portion (22) is adapted to encompass an unjacketed segment of cable (28). The crimp ring (10) is crimped onto the unjacketed segment about small diameter portion (22), and coupling means, e.g., flange member (24), are used to couple crimp ring (10) to connector plug (36) by crimping on flange member (24). The connector plug (36) receives crimp ring (10) therein, has a bore (38) through which the cable (28) passes, and has an outlet (42) where the cable (28) is cleaved.

15 Claims, 1 Drawing Sheet

OPTICAL FIBER CABLE CONNECTOR ASSEMBLY

BACKGROUND OF THE INVENTION

1. Field of the Invention

This invention relates to connector assemblies for optical fiber cables, and more particularly to a connector assembly for coupling the end of an optical fiber cable in a coupling fixture.

2. Related Art

U.S. Pat. 4,753,510 to Sezerman, dated Jun. 28, 1988, discloses an optical fiber cable lens holder in which a fiber ferrule (56) is crimped onto an optical fiber cable (12) at a reduced diameter section (62) and an enlarged section (58). The optical fiber terminates within the fiber ferrule, and the fiber ferrule is inserted within a lens holder (24) to dispose the end of the optical fiber cable in proximity to a lens, (72) through which a light signal may pass. The fiber ferrule is secured within the lens holder with glue or potting compound (see column, line 59 through column 7, line 43).

U.S. Pat. 5,071,218 to Nishimoto, dated Dec. 10, 1991, discloses and optical connector ferrule, including one referred to as prior art and depicted in FIG. 2 as a "crimp and cleave" type connector ferrule (30) having a compression sleeve (33) therein. The optical fiber (10) is fitted through the compression sleeve and the ferrule is crimped onto the optical fiber cable. Then, the part of the cable that protrudes from the ferrule (30) is cleaved by means of a cutting blade (34). No attempt is made to crimp ferrule (30) onto the jacket (12) of the optical fiber cable (10).

U.S. Pat. No. 5,159,652 to Grassin d'Alphonse et al, dated Oct. 27, 1992, discloses a quick action connector for optical fibers. The connector comprises a plug body (2) which is crimped onto an internal sheath (8) of an optical fiber cable which also comprises a reinforcement (7) and an external sheath (6) surrounding the fiber (5). The optical fiber extends through the plug body (2) and is received within a plug pin (4) that is secured to plug body (2). The plug body serves to couple the optical fiber to a coupling fixture (1), to align the end of the optical fiber with the end of another fiber having a similar connector apparatus.

SUMMARY OF THE INVENTION

The present invention relates to a connector assembly for an optical fiber cable comprising a clad core and at least an outer jacket. The assembly comprises a crimp ring comprising a generally tubular sleeve defining a sleeve bore extending therethrough. The sleeve bore has a sleeve input end and a sleeve output end and a stepped configuration defining a large diameter portion near the sleeve input end and a small diameter portion near the sleeve output end. The large diameter portion is dimensioned and configured to encompass therein a jacketed segment of an optical fiber cable defined below, and the small diameter portion being dimensioned and configured to encompass therein an unjacketed segment of the optical fiber cable. The sleeve is at least partially disposed in the plug bore of a generally tubular connector plug that defines a plug bore extending therethrough. The plug bore has a plug input end and a plug outlet end, the plug inlet end being dimensioned and configured to receive the sleeve therein, and the plug outlet end being dimensioned and configured to encompass therein an unjacketed segment of the optical fiber cable and to dispose the optical fiber cable substantially concentrically within the connector plug. The assembly also comprises coupling means, either on the crimp ring or on the connector plug, for coupling the crimp ring to the connector plug at the plug input end with the sleeve bore substantially aligned with the plug bore. A partially stripped optical fiber cable having a jacketed segment and an unjacketed segment is secured in, and passes through, the sleeve bore with the unjacketed segment extending from the small diameter portion of the sleeve bore to the plug bore outlet end.

According to one aspect of the invention, the plug outlet end may be dimensioned and configured to encompass an unjacketed segment of optical fiber cable that is stripped down relative to the unjacketed segment of the optical fiber cable encompassed by the small diameter portion of the sleeve bore. For example, the plug outlet end may directly encompass the clad core of the optical fiber cable while the small diameter portion of the sleeve bore encompasses a buffer layer coating on the clad core.

Preferably, the sleeve comprises a deformable material so that the crimp ring can be crimped onto the unjacketed segment of the optical fiber cable disposed in the small diameter portion of the sleeve bore.

According to another aspect of the invention, the coupling means may comprise a flange member mounted on the sleeve. The flange member may comprise a deformable material and may be dimensioned and configured to define a generally annular cavity about the sleeve for receiving the connector plug near the plug inlet end when the sleeve is in the plug bore, so that the crimp ring can be crimped onto the connector plug by applying a crimping force on the flange member. Preferably, the annular cavity is concentric with the large diameter portion of the sleeve bore, whereby crimping the crimp ring to the connector plug can also crimp the sleeve onto the jacket of the optical fiber cable.

The present invention also provides a method for attaching a connector assembly to the end of an optical fiber cable comprising a clad core, a buffer layer about the clad core and an external jacket, the assembly comprising a crimp ring comprising a sleeve defining a sleeve bore therethrough and comprising a deformable material, the sleeve bore having a sleeve input end and a sleeve output end, the assembly further comprising a connector plug defining a plug bore therethrough, the plug bore having a plug inlet end and a plug outlet end, the plug inlet end being dimensioned and configured to receive the sleeve and the plug outlet end being dimensioned and configured to snugly engage the optical fiber cable. The method comprises the steps of:

a) partially stripping a segment of the optical fiber cable to define a jacketed segment and an unjacketed segment;

b) inserting the partially stripped segment of the optical fiber cable through the sleeve bore so that the optical fiber cable extends beyond the crimp ring outlet end to define an extending unjacketed segment having a length sufficient to protrude from the plug outlet end when the sleeve is received in the plug bore inlet end;

c) fixing the crimp ring in place on the unjacketed segment of the optical fiber cable;

d) inserting the extending portion of the optical fiber cable into the plug bore inlet;

e) coupling together the crimp ring and the connector plug so that the sleeve bore is substantially aligned with the plug bore and so that the extending portion of the optical fiber cable protrudes through the plug outlet end; and f) cleaving the protruding end of the optical fiber cable at the plug outlet end.

Fixing the crimp ring in place on the optical fiber cable may comprise crimping the sleeve onto the unjacketed segment. Preferably, the crimp ring comprises a deformable flange member attached to the sleeve, the flange member defining a generally annular cavity about the sleeve, the annular cavity being dimensioned and configured to receive the connector plug therein. In such case, coupling together the crimp ring and the connector plug may comprise inserting the connector plug into the annular cavity and applying a crimping force to the flange member. If the sleeve bore has a stepped internal configuration defining a large diameter portion near the sleeve input end dimensioned and configured to encompass the jacketed segment of the optical fiber cable, and a small diameter portion near the sleeve outlet end dimensioned and configured to encompass the unjacketed segment of the optical fiber cable, and if the annular cavity is concentric with the large diameter portion, then applying a crimping force to the flange member may also crimp the crimp ring onto the jacketed segment of the optical fiber cable.

Stripping the optical fiber cable may define an unjacketed segment comprising a buffer layer segment and a clad core segment, and in such case crimping the crimp ring onto the unjacketed segment may comprise crimping the sleeve onto the buffer layer segment. Alternatively, stripping the optic fiber cable may define a clad core segment stripped of both the jacket and the buffer layer, and crimping the crimp ring in place on the optical fiber cable may then comprise crimping the sleeve onto the clad core segment.

DETAILED DESCRIPTION OF THE INVENTION AND PREFERRED EMBODIMENTS THEREOF

The present invention provides a connector assembly for an optical fiber cable which facilitates the optical coupling of the end of an optical fiber cable with the end of another such cable. This is accomplished by providing a connector assembly which allows for facile manipulation of the end of the fiber and the disposition thereof in a coupling fixture adapted to receive the connector assembly.

Figure 1:
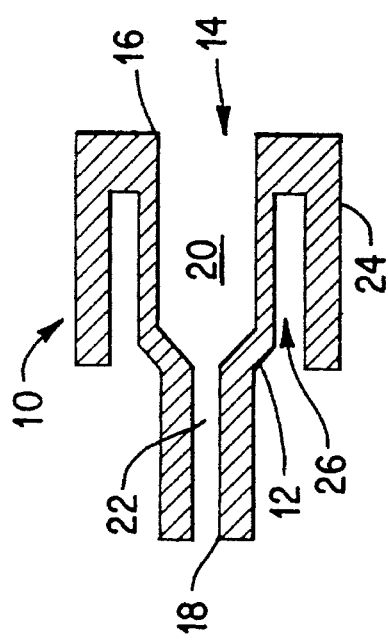
FIG. 1 is a cross-sectional view of a crimp ring used in one embodiment of an optical fiber connector assembly according to the present invention.

There is shown in FIG. 1 a crimp ring 10 for use in a connector assembly according to one embodiment of the present invention. Crimp ring 10 comprises a generally tubular sleeve 12 having a sleeve bore 14 extending axially therethrough. Sleeve bore 14 has a sleeve input end 16 and a sleeve output end 18. Sleeve bore 14 has a stepped interior configuration defining a large diameter portion 20 and a small diameter portion 22. Large diameter portion 20 is dimensioned and configured to encompass a segment of an optical fiber cable comprising an outer jacket, i.e., a jacketed segment of an optical fiber cable. Small diameter portion 22, which leads to sleeve output end 18 is stepped-down relative to large diameter portion 20 and is dimensioned and configured to encompass a segment of an optical fiber cable that has been stripped of its external jacket, i.e., an unjacketed segment. If the optical fiber cable comprises a buffer layer between the outer jacket and the inner clad core, small diameter portion 22 may be dimensioned and configured to encompass the buffer layer or, alternatively, to directly encompass the clad core.

Crimp ring 10 comprises coupling means for coupling crimp ring 10 to a connector plug. In the illustrated embodiment, the coupling means comprises flange member 24 which defines a generally annular cavity 26 about sleeve 12. As will be described below, annular cavity 26 is dimensioned and configured to receive the input end of a connector plug therein. Preferably, flange member 24 comprises a deformable material which, like the material of sleeve 12, is easily crimped to secure it to another structure, i.e., to the connector plug. Preferably, flange member 24 is concentric with large diameter portion 20 of sleeve bore 14. Crimp ring 10 may be formed as an integral structure, preferably from a low cost die-castable Zamak #3 zinc material, although those skilled in the art will recognize that other metallic alloy materials will be acceptable as well.

Figure 2:
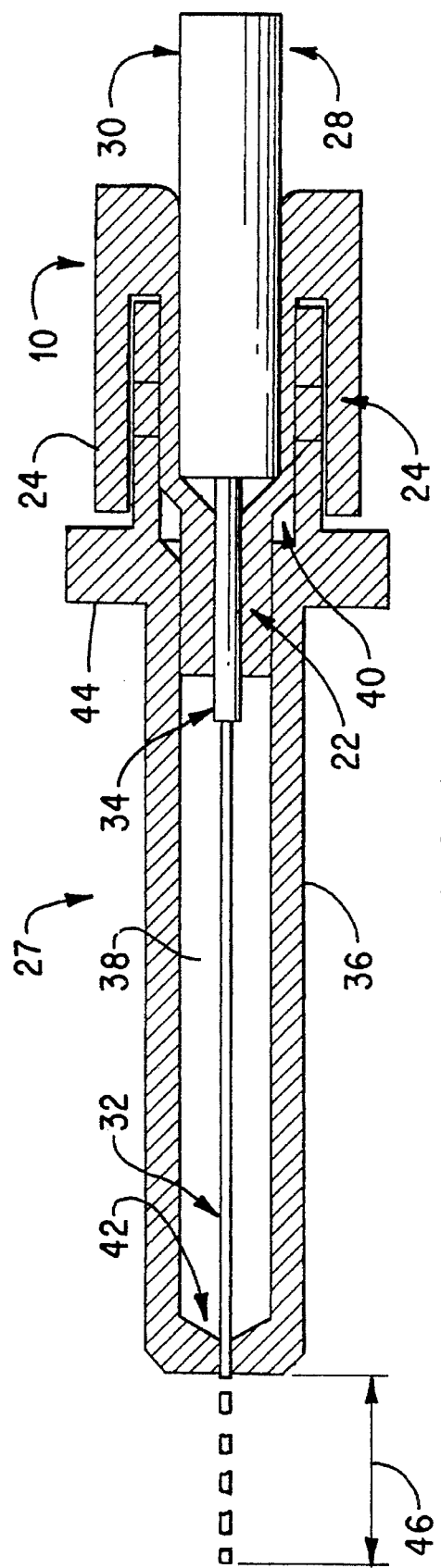
FIG. 2 is a cross-sectional view of a fully assembled connector assembly comprising the crimp ring of FIG. 1 according to one embodiment of the present invention.

A connector assembly 27 comprising crimp ring 10 is shown in FIG. 2. In FIG. 2, an optical fiber cable 28 comprises an outer jacket 30, which is typically a layer of polyvinylchloride polymer, a clad core 32 and an intermediate buffer layer 34, which may be a layer of TEFZEL™ ETFE (ethylenetetrafluoroethylene) (TEFZEL™ is a trademark of E. I. DuPont de Nemours and Company). As seen in FIG. 2, large diameter portion 20 of sleeve bore 14 is dimensioned and configured to encompass a jacketed segment of optical fiber cable 28, disposed therein. For example, large diameter portion 20 may have an interior diameter of about 2.388 mm (0.094 inches). In the particular embodiment illustrated in these Figures, small diameter portion 22 is dimensioned and configured to encompass buffer layer 34, i.e., to encompass a buffer layer segment of the unjacketed segment of optical fiber cable 28. For example, the internal diameter of small diameter portion 22 may be about 0.838 mm (0.033 inches). Accordingly, the unjacketed segment of optical fiber cable 28 disposed within small diameter portion 22 of sleeve bore 14 is only partially stripped, to define a buffer layer segment. In an alternative embodiment, the unjacketed segment of optical fiber cable 28 disposed within small diameter portion 22 may be stripped of buffer layer 34 as well as of jacket 30, and small diameter portion 22 may be dimensioned and configured accordingly to encompass therein a clad core segment of optical fiber cable 28. In such case, the internal diameter of small diameter portion 22 may be about 0.61 mm (0.024 inches).

Connector assembly 27 also comprises a generally tubular connector plug 36 defining a plug bore 38 that extends axially therethrough. Plug bore 38 has a plug inlet end 40 dimensioned and configured to slidably receive sleeve 12 therein. For example, if the outer diameter of sleeve 12 around small diameter portion 22 is about 2.18 mm (0.086 inches) and the outer diameter around large diameter portion 20 is about 3.175 mm (0.125 inches), plug inlet end 40 may have a stepped interior diameter of about 3.23 mm (0.127 inches) at the inlet end to receive the large diameter portion and about 2.24 mm (0.088 inches) to receive the small diameter portion. Plug bore 38 also has a plug outlet end 42 dimensioned and configured to encompass the clad core 32 of optical fiber cable 28, and to dispose the end of optical fiber cable 28 concentrically with the connector plug. Preferably, plug bore 38 is necked down from plug inlet end 40 to plug outlet end 42 to guide the end of optical fiber cable 28 through plug outlet end 42 as crimp ring 10 is being inserted into connector plug 36. In a particular embodiment, plug outlet end 42 may have an internal diameter of about 0.230 mm (0.009 inches) to encompass a clad core having a diameter of about 0.200 mm (0.008 inches). Connector plug 36 also comprises an annular fence member 44 to limit the degree of which the connector assembly can be inserted into a coupling fixture (not shown).

To assemble the connector assembly illustrated in FIG. 2, optical fiber cable 28 is partially stripped to define a jacketed segment that will be disposed in the large diameter portion 20 of sleeve bore 14 and an unjacketed segment to be encompassed by small diameter portion 22 and plug outlet end 42. In the illustrated embodiment, the unjacketed segment comprises a buffer layer segment to be disposed within small diameter portion 22. The remainder of the unjacketed segment is long enough to protrude through plug outlet end 42 when crimp ring 10 is secured onto optical fiber cable 28 as shown.

To secure crimp ring 10 onto optical fiber 28, the unjacketed segment of optical fiber cable is inserted through sleeve bore 14 so that the jacketed segment is disposed substantially within large diameter portion 20, and so that small diameter portion 22 encompasses the unjacketed segment, whether it comprises a buffer layer segment as illustrated, or alternatively, a clad core segment without jacket or buffer layer. Crimp ring 10 is then secured onto optical fiber 28 in the region of small diameter portion 22, preferably by crimping sleeve 12 onto the unjacketed segment of optical fiber cable 28, at small diameter portion 22. This first crimp operation is believed to provide the principal means of attachment of the connector assembly to the optical fiber cable 28.

As indicated above, plug bore 38 is dimensioned and configured to slidably receive therein sleeve 12. Similarly, annular cavity 26 is dimensioned and configured to slidably receive therein the inlet end of connector plug 36. Preferably, the clearance for sleeve 12 within the plug inlet end 40 of plug bore 38 allows for easy insertion of sleeve 12 therein after crimp ring 10 is attached to optical fiber cable 28, without excessive clearance between the connector plug 36 and crimp ring 10 such as would hinder subsequent coupling of these two structures. Plug inlet end 40 is preferably dimensioned and configured to accomodate any expected deformation of sleeve 12 that may occur by crimping sleeve 10 onto optical fiber cable 28 as described above.

After crimp ring 10 is secured onto optical fiber cable 28, the unjacketed segment of optical fiber cable 28 protruding from crimp ring 10 is inserted into plug bore 38. Then, crimp ring 10 is coupled to connector plug 36 with sleeve bore 14 substantially aligned with plug bore 38. Preferably, sleeve 12 is inserted into the plug bore inlet end of connector plug 36 and the inlet end of connector plug 36 has been received in annular cavity 26. In a particular embodiment, annular cavity 26 may have a radial width of about 4.65 mm (0.183 inches). Then these two structures can be coupled together by applying a crimping force to flange member 24, to secure crimp ring 10 onto connector plug 36.

Optionally, the second crimping step, in which crimp ring 10 is secured onto connector plug 36, if performed with sufficient force, can transfer the crimping force through the inlet end of connector plug 36 to effect a crimping attachment of sleeve 12 about large diameter portion 20 onto jacket 30 of optical fiber cable 28. This secondary crimping attachment bolsters the integrity of the bond between the optical fiber cable and the connector assembly, and also provides a stress relief mechanism by which longitudinal stresses imposed on optical fiber cable 28 are inhibited from being transferred to the unjacketed segment disposed in small diameter portion 22.

Finally, the length of optical fiber cable 28 that protrudes beyond plug outlet end 42 is cleaved in a conventional manner known to those skilled in the art. A suitable tool used for the cleaving process is disclosed in U.S. Pat. No. 5,018,021, the disclosure of which is incorporated herein by reference as background material. The cleaved portion 46 is shown in phantom outline. The completed assembly is then ready to be inserted into a coupling fixture in which to align the cleaved end of the optical fiber cable with the end of another cable similarly equipped with a connector assembly, or to an active device receptacle which may contain, e.g., a light emitting diode or a photodetector.

The connector assembly in accordance with the present invention provides the advantages in that the crimp ring is easily secured onto the optical fiber cable, and provides an easy tool for manipulating the unjacketed terminal segment of optical fiber 28 for insertion into connector plug 36 during the assembly process. In addition, by limiting the primary bond between the crimp ring 10 and optical fiber cable 28 to the inlet region of the connector plug 36, the terminal segment of optical fiber cable 28 that extends from sleeve output end 18 to plug bore outlet end 42 is free from stress, thus reducing the likelihood of stress fractures that may be caused by various factors, e.g., thermal expansion or contraction due to temperature variations as would occur in a fully potted connector plug. On the other hand, when the crimp at flange member 24 crimps crimp ring 10 onto the jacketed segment of the optical fiber cable, the unjacketed portion disposed in the connector assembly is isolated from strain and torsion that may be applied to the optical fiber cable. Further still, the connector assembly described above can be achieved without the use of adhesive to mount crimp ring 10 to the optical fiber cable 28 or to couple crimp ring 10 with connector plug 36. Instead, crimp ring 10 may be attached to optical fiber cable 28 and coupled onto connector plug 36 using a single crimping tool. Thus, the assembly process is significantly simplified. Also, since the bond between the connector assembly and the optical fiber cable 28 is the crimp between sleeve 12 and the optical fiber cable, the material from which connector plug 36 is formed may be chosen to accomodate the requirements of special applications or environmental factors, without regard to the ability of the material to bond directly to the optical fiber cable. Thus, the material from which connector plug 36 is formed may be chosen for its low cost or to have a particular coefficient of thermal expansion, without regard to the ability of such material to crimp effectively to optical fiber cable 28. The present invention is well suited for use with inexpensive, plastic optical fiber cable, which is typically made from polymethylmethacrylate or other polymer compounds known in the art.

While the invention has been described in detail with reference to a particular embodiment thereof, it will be apparent that upon a reading and understanding of the foregoing, numerous alterations to the described embodiment will occur to those skilled in the art and it is intended to include such alterations within the scope of the appended claims.

What is claimed is:

1. A connector assembly for an optical fiber cable comprising a clad core and at least an outer jacket, the assembly comprising:

a crimp ring comprising a generally tubular sleeve defining a sleeve bore extending therethrough, the sleeve bore having a sleeve input end and a sleeve output end and having a stepped configuration defining a large diameter portion near the sleeve input end and a small diameter portion near the sleeve output end, the large diameter portion being dimensional and configured to encompass therein a jacketed segment of the optical fiber cable defined below, and the small diameter portion being dimensioned and configured to encompass therein an unjacketed segment of the optical fiber cable, the sleeve being at least partially disposed in the plug bore of the connector plug defined below;

generally tubular connector plug defining a plug bore extending therethrough, the plug bore having a plug input end and a plug outlet end, the plug input end being dimensioned and configured to receive the sleeve therein, and the plug outlet end being dimensioned and configured to encompass therein an unjacketed segment of the optical fiber cable and to dispose the optical fiber cable substantially concentrically within the connector plug;

coupling means on the crimp ring or on the connector plug for coupling the crimp ring to the connector plug at the plug input end with the sleeve bore substantially aligned with the plug bore; and a partially stripped optical fiber cable having a jacketed segment and an unjacketed segment secured in, and passing through, the sleeve bore with the unjacketed segment extending from the small diameter portion of the sleeve bore to the plug bore outlet end, wherein the sleeve comprises a deformable material whereby the crimp ring can be crimped onto the unjacketed segment of the optical fiber cable disposed in the small diameter portion of the sleeve bore.

2. The connector assembly of claim 1 wherein the plug outlet end is dimensioned and configured to encompass an unjacketed segment of optical fiber cable that is stripped down relative to the unjacketed segment of the optical fiber cable encompassed by the small diameter portion of the sleeve bore.

3. The connector assembly of claim 1 wherein the coupling means comprises a flange member mounted on the sleeve, the flange member comprising a deformable material and being dimensioned and configured to define a generally annular cavity about the sleeve for receiving the connector plug near the plug input end when the sleeve is in the plug bore, whereby the crimp ring can be crimped onto the connector plug by applying a crimping force on the flange member.

4. The connector assembly of claim 3 wherein the flange member defines an annular cavity that is concentric with the large diameter portion of the sleeve bore, whereby crimping of the crimp ring to the connector plug can also crimp the sleeve onto the jacket of the optical fiber cable.

5. A connector assembly for an optical fiber cable comprising a clad core having a multi-layer coating comprising at least an outer jacket surrounding the optical fiber cable and a buffer layer between the jacket and the clad core, the connector assembly comprising;

a crimp ring comprising a generally tubular sleeve defining a sleeve bore extending therethrough, the sleeve bore having a sleeve input end and a sleeve outlet end and having a stepped interior diameter including a large diameter portion near the sleeve input end and a small diameter portion near the sleeve outlet end, the large diameter portion being dimensioned and configured to encompass the jacket of the optical fiber cable and the smaller diameter portion being dimensioned and configured to encompass one of the buffer layer and the clad core of the optical fiber cable, the sleeve being at least partially disposed in the plug bore of the connector plug defined below;

a coupling flange attached to the sleeve, the coupling flange defining a generally annular cavity about the sleeve for receiving therein the connector plug when the sleeve is disposed within the plug bore;

a generally tubular connector plug defining a plug bore extending therethrough, the plug bore having a plug input end and a plug outlet end, the plug outlet end being dimensioned and configured to encompass the clad core of the optical fiber cable with the clad core disposed substantially concentrically with the connector plug, the connector plug being secured in the annular cavity defined by the coupling flange; and a partially stripped end of the optical fiber cable comprising a jacketed segment and a terminal unjacketed segment, the optical fiber cable being secured in, and extending through, the crimp ring and the connector plug, the sleeve of the crimp ring being crimped at the small diameter portion onto an unjacketed segment on the optical fiber cable at a point appropriate to provide an extending portion of the optical fiber cable that reaches the plug outlet end, the optical fiber cable segment encompassed by the plug outlet end comprising only the clad core, and wherein the optical fiber cable terminates at the plug outlet end.

6. The connector assembly of claim 5 wherein the sleeve comprises a deformable material whereby the crimp ring can be crimped at the small diameter portion onto the unjacketed segment of the optical fiber cable.

7. The connector assembly of claim 6 wherein the unjacketed segment encompasssed by the small diameter portion comprises the buffer layer and wherein the crimp ring is crimped onto the buffer layer.

8. The connector assembly of claim 6 wherein the unjacketed segment encompassed by the small diameter portion is stripped of both the buffer layer and the external jacket, and wherein the crimp ring is crimped onto the clad core.

9. The connector assembly of claim 5, claim 6 claim 7 or claim 8 wherein the flange member comprises a deformable material, whereby the crimp ring can be crimped onto the connector plug.

10. A method for attaching a connector assembly to the end of an optical fiber cable, the optical fiber cable comprising a clad core, a buffer layer about the clad core and an external jacket, the assembly comprising a crimp ring comprising a sleeve defining a sleeve bore therethrough and comprising a deformable material, the sleeve bore having a sleeve input end and a sleeve output end, the assembly further comprising a connector plug defining a plug bore therethrough, the plug bore having a plug inlet end and a plug outlet end, the plug inlet end being dimensioned and configured to receive the sleeve and the plug outlet end being dimensioned and configured to snugly engage the optical fiber cable, the method comprising:

partially stripping a segment of the optical fiber cable to define a jacketed segment and an unjacketed segment;

inserting the partially stripped segment of the optical fiber cable through the sleeve bore so that the optical fiber cable extends beyond the crimp ring outlet end to define an extending unjacketed segment having a length sufficient to protrude from the plug outlet end when the sleeve is received in the plug bore inlet end;

fixing the crimp ring in place on the unjacketed segment of the optical fiber cable;

inserting the extending portion of the optical fiber cable into the plug bore inlet;

coupling together the crimp ring and the connector plug so that the sleeve bore is substantially aligned with the plug bore and so that the extending portion of the optical fiber cable protrudes through the plug outlet end; and cleaving the protruding end of the optical fiber cable at the plug outlet end.

11. The method of claim 10, wherein fixing the crimp ring in place on the optical fiber cable comprises crimping the sleeve onto the unjacketed segment.

12. The method of claim 11 wherein the crimp ring comprises a deformable flange member attached to the sleeve, the flange member defining a generally annular cavity about the sleeve, the annular cavity being dimensioned and configured to receive the connector plug therein, wherein coupling together the crimp ring and the connector plug comprises inserting the connector plug into the annular cavity and applying a crimping force to the flange member.

13. The method of claim 12 wherein the sleeve bore has a stepped internal configuration defining a large diameter portion near the sleeve input end dimensioned and configured to encompass the jacketed segment of the optical fiber cable, and a small diameter portion near the sleeve outlet end dimensioned and configured to encompass the unjacketed segment of the optical fiber cable, and wherein the annular cavity is concentric with the large diameter portion, and wherein applying a crimping force to the flange member also crimps the crimp ring onto the jacketed segment of the optical fiber cable.

14. The method of claim 10, claim 11 or claim 12 wherein stripping the optical fiber cable defines an unjacketed segment comprising a buffer layer segment and a clad core segment, and wherein crimping the crimp ring onto the unjacketed segment comprises crimping the sleeve onto the buffer layer segment.

15. The method of claim 10, claim 11 or claim 12 wherein stripping the optic fiber cable defines a clad core segment stripped of both the jacket and the buffer layer, and wherein crimping the crimp ring in place on the optical fiber cable comprises crimping the sleeve onto the clad core segment.

* * * * *